United States Patent
Baets et al.

(10) Patent No.: US 8,620,120 B2
(45) Date of Patent: Dec. 31, 2013

(54) RETRO-REFLECTIVE STRUCTURES

(75) Inventors: Roel Baets, Deinze (BE); Wim Bogaerts, Melle (BE); Katrien De Vos, Ghent (BE); Stijn Scheerlinck, Ledeberg (BE)

(73) Assignees: IMEC, Leuven (BE); Universiteit Ghent, Ghent (BE)

(*) Notice: Subject to any disclaimer, the term of this patent is extended or adjusted under 35 U.S.C. 154(b) by 296 days.

(21) Appl. No.: 13/000,825

(22) PCT Filed: Jun. 23, 2009

(86) PCT No.: PCT/EP2009/057849
§ 371 (c)(1),
(2), (4) Date: Dec. 22, 2010

(87) PCT Pub. No.: WO2009/156410
PCT Pub. Date: Dec. 30, 2009

(65) Prior Publication Data
US 2011/0116735 A1 May 19, 2011

Related U.S. Application Data

(60) Provisional application No. 61/074,876, filed on Jun. 23, 2008, provisional application No. 61/074,882, filed on Jun. 23, 2008.

(51) Int. Cl.
*G02B 6/26* (2006.01)

(52) U.S. Cl.
USPC ............... 385/31; 385/14; 385/15; 385/24; 385/37; 385/39

(58) Field of Classification Search
USPC ................ 385/12, 14, 15, 24, 31, 37, 39
See application file for complete search history.

(56) References Cited

U.S. PATENT DOCUMENTS 6,925,213 B2   8/2005   Boyd et al.
(Continued)

FOREIGN PATENT DOCUMENTS

| WO | WO03/064995 | 8/2003 |
|----|-------------|--------|
| WO | WO2004/034007 | 4/2004 |
| WO | WO2007/019676 | 2/2007 |

OTHER PUBLICATIONS

PCT International Application Search Report and Written Opinion, PCT International Application No. PCT/EP2009/057849 dated Sep. 28, 2009.

Van Laere, F. et al., "Compact and Highly Efficient Grating Couplers Between Optical Fiber and Nanophotonic Waveguides in Bonded InP-Membranes", Optical Communications, 2006, pp. 1-2.

Kajikawa, Kotaro et al., "Optical Fiber Biosensor Based on Localized Surface Plasmon Resonance in Gold Nanoparticles", Proceedings of SPIE, vol. 5593, 2004, pp. 494-501.

(Continued)

*Primary Examiner* — Jennifer Doan
(74) *Attorney, Agent, or Firm* — McDonnell Boehnen Hulbert & Berghoff LLP

(57) ABSTRACT

A photonic integrated circuit (410) is described comprising at least one signal processing circuit (110). The signal processing circuit (110) comprises at least one input coupling element (120) for coupling incident light from a predetermined incoupling direction into the photonic integrated circuit (410), and at least one output coupling element (130) for coupling light out of the photonic integrated circuit (410) into an outcoupling direction. The relation between the incoupling direction and the outcoupling direction is different from a relation according to the law of reflection and the incoupling direction and the outcoupling direction are substantially the same. Furthermore, an optical sensor probe (400) comprising such a photonic integrated circuit (410) is disclosed. In some embodiments, the optical sensor probe (400) comprises an optical fiber (420) having a first facet and comprises a sensing element physically attached to the first facet, wherein the sensing element comprises said photonic integrated circuit (410).

23 Claims, 9 Drawing Sheets

(56) References Cited

U.S. PATENT DOCUMENTS

| | | |
|---|---|---|
| 7,184,386 B2 | 2/2007 | Nikolai |
| 7,298,935 B1 * | 11/2007 | Black et al. .................... 385/11 |
| 2002/0085784 A1 | 7/2002 | Reimer |
| 2003/0032039 A1 | 2/2003 | Cunningham et al. |

OTHER PUBLICATIONS

Schrauwen, J. et al., "Trimming of Silicon Ring Resonator by Electron Beam Induced Compaction and Strain", Optics Express, No. 16, No. 6, 2008, pp. 3738-3743.

* cited by examiner

RETRO-REFLECTIVE STRUCTURES

CROSS-REFERENCE TO RELATED APPLICATIONS

The present application is a national stage application of International Patent Application no. PCT/EP2009/057849, which claims priority to U.S. Provisional Patent Applications Nos. 61/074,876 and 61/074,882.

FIELD OF THE INVENTION

The present invention relates to photonic integrated circuits and optical sensor probes comprising such photonic integrated circuits. More particularly, the present invention relates to photonic integrated circuits featuring at least one optical signal processing unit enabling non-specular reflective read-out and to optical sensor probes comprising such photonic integrated circuits.

BACKGROUND OF THE INVENTION

Specular reflection causes a number of problems in identification, sensing and read-out applications. Identification applications, wherein information is retrieved from data carriers e.g. located on an object to be indentified are widely spread. Current marker techniques, such as for example barcodes or RFID tags do not allow efficient localization of the data carrier on the marked object. In case of barcodes, localization requires complex image processing, while RFID localization may suffer from a poor resolution because of the large wavelength of the radiowaves used. The lack of a good localization possibility limits the use of these techniques. This problem can be overcome by using optical wavelengths or light, e.g. infrared light, for identification applications. Although this requires the objects to be in line of sight, the spatial resolution can be drastically improved as compared to RF based techniques. To identify an object, a photonic integrated circuit (PIC) comprising an identifying signal processing unit or marker chip can e.g. be attached to the object. The marker chip may be flood exposed by use of e.g. a wavelength tuneable laser and its response may be detected by use of e.g. a camera or a detector. Specular reflection of the marker chip makes such components nevertheless useless in remote read-out configurations as the reflected response can only be captured by such a remote control unit in case of perpendicular incidence on the sensor.

A second example for which non-specular transmission or reflection of optical signals is an important feature is in remote read-out of sensors such as for example environmental sensors, control sensors, or monitor sensors. Optical sensors are used in a broad variety of applications. They offer advantages as compared to other types of sensors, including immunity to electro-magnetic interference (EMI), very good stability, long life, small size and low cost. They are especially useful in harsh environments, such as in environments with a high temperature, vibrations, EMI or dust. Optical sensors can be used to measure a wide variety of parameters. Depending on their specific design, specific functionalization or combination thereof, they can be used for measuring for example stress, pressure, strain, torque, vibrations, acoustic waves, temperature, magnetic/electric field, ionizing radiation, biological substances, chemicals, biochemical reactions, drugs, proteins or a combination thereof. Read-out of such sensors, typically performed by exposing the sensors to light and detecting their response, is often difficult as specular reflection results in the impossibility for using a single handheld read-out device unless the read-out occurs perpendicularly with respect to the sensor surface.

To enable optical read-out of optical sensors without the use of on-site optical-electrical conversion, the sensors can be monolithically or hybridly integrated with an optical fiber, or the sensors can be read out remotely by exposing the sensors to light and detecting their response, for example by use of a handheld device combining a light source and a detector. A practicable embodiment allowing the use of a handheld device combining light source and detector is only possible when the optical signal processing units, in casu the optical sensor, enables a response, wherein the light sent back by the sensor to the detector follows substantially the same optical path to the handheld device as the light sent by the handheld device to the sensor.

Several types of optical sensors exist. One type of optical sensor is based on photonic integrated circuits (PICs), also called photonic lightwave circuits (PLCs). PICs (Photonic Integrated Circuits) enable label-free sensing of a multitude of parameters with good signal-to-noise ratio or e.g. good sensitivity. PICs are widely studied for sensing of a multitude of parameters and have been implemented in array configurations to realise micro-array sensor systems. To date, micro-array sensors using PIC technology require stable light incoupling in the PIC waveguides to enable high sensitivity or high signal-to-noise ratio. Coupling is realised by butt-coupling fiber bundles to the PIC. However, this demands for stringent alignment requirements. Moreover, the degree of multiplexing is limited by the physical constraints of fiber bundles. PICs exist in a variety of forms and material systems such as for example low-index contrast waveguide platforms (e.g. polymer waveguides, glass/silica waveguides, $Al_xGa_{1-x}As$ waveguides, $In_xGa_{1-x}As_yP_{1-y}$ waveguides), high-index contrast waveguides (e.g. Silicon-on-Insulator, semiconductor membranes), plasmonic waveguides (e.g. metal nano-particle arrays, metal layers). A PIC comprises at least one integrated optical component, such as for example an integrated optical cavity, an integrated optical resonator, an integrated optical interferometer, an integrated optical coupler, a waveguide, a grating or a combination thereof. The optical components can be active or passive. The components can be integrated for example monolithically, heterogeneously or hybridly. Given their small size, PICs and PIC components offer numerous benefits for sensing, such as the potential for the development of miniaturized, compact and robust sensing elements, and prospect of mass fabrication of multiple sensors on one chip. Moreover, because of the opportunity of using very long interaction lengths, PICs and PIC components can show superior sensitivity when compared to bulk optic components. PICs are widely studied for sensing applications, however achieving a tight contact between the environment to be sensed and the sensing element is not easy, especially in remote or in-vivo sensing applications.

A second type of optical sensors are optical fiber sensors. This type of sensors is very suitable for being used in environments that are difficult to access and are therefore the sensors of choice for in-vivo applications. Optical sensors wherein an optical sensing element is provided at a facet of an optical fiber are for example described in U.S. Pat. No. 6,925, 213, WO2004/034007, WO2007/019676, Proc. SPIE Vol. 5593, p. 494-501. This type of optical sensors enables a tight contact between the environment to be sensed and the sensing element. However, their performance in terms of sensitivity, flexibility, multidimensional and multi-parameter sensing capability is generally inferior to PIC based optical sensors.

SUMMARY OF THE INVENTION

The present invention relates to a photonic integrated circuit comprising at least one signal processing circuit, the at least one signal processing circuit comprising at least one input coupling element for coupling incident light from a predetermined incoupling direction into the photonic integrated circuit, and at least one output coupling element for coupling light out of the photonic integrated circuit into an outcoupling direction, wherein the relation between the incoupling direction and the outcoupling direction is different from a relation according to the law of reflection, the incoupling direction and the outcoupling direction being substantially opposite so that retro-reflective operation is obtained. It is an advantage of embodiments according to the present invention that retro-reflective photonic integrated circuits can be obtained.

The at least one input coupling element may be the same element as the at least one output coupling element.

The at least one signal processing circuit may comprise a plurality of input coupling elements, such that the response or the properties of the light coupled out of the photonic integrated circuit are insensitive to the direction of light incidence on the photonic integrated circuit. The at least one signal processing circuit may comprise a plurality of output coupling elements, such that the response or the properties of the light coupled out of the photonic integrated circuit are insensitive to the direction of light incidence on the photonic integrated circuit. It is an advantage of embodiments according to the present invention that the retro-reflective aspect can be made independent of the incoupling direction for a large range of incoupling directions.

The photonic integrated circuit may be part of a sensing element and integrated on a facet of an optical fiber, e.g. on a facet of at least one optical fiber.

The present invention also relates to an optical sensor probe, the optical sensor probe comprising a photonic integrated circuit, comprising at least one signal processing circuit, the at least one signal processing circuit comprising at least one input coupling element for coupling incident light from an incoupling direction into the photonic integrated circuit, and at least one output coupling element for coupling light out of the photonic integrated circuit into an outcoupling direction, wherein the relation between the incoupling direction and the outcoupling direction is different from a relation according to the law of reflection, the incoupling direction and the outcoupling direction being substantially opposite so that retro-reflective operation is obtained.

The at least one input coupling element can be the same element as the at least one output coupling element.

The optical sensor probe may comprise at least one optical fiber having a first facet and a sensing element physically attached to the first facet, wherein the sensing element comprises said photonic integrated circuit. The at least one optical fiber may be an optical fiber array.

The photonic integrated circuit may comprise an optical coupling element for coupling light between the at least one optical fiber and the photonic integrated circuit and the photonic integrated circuit may comprise one or more light guiding structures adapted to guiding light as an optical mode.

The photonic integrated circuit may comprise at least one optical component being adapted for generating an optical response to an external parameter.

The at least one optical component may be a resonator, a micro-ring resonator, a plasmon resonator, a cavity, an interferometer, a coupler, a splitter, a waveguide, a one-dimensional grating, a two-dimensional grating, a multiplexer, a demultiplexer or a combination thereof.

The optical response may be a change in resonance frequency, intensity, phase, polarization or spectrum of a beam.

The external parameter may be a temperature, strain, stress, pressure, torque, vibration, an acoustic wave, a magnetic field, an electric field, a biological substance, a chemical, a biochemical reaction, a drug, a protein or a combination thereof.

The surface of the photonic integrated circuit may be at least partially functionalized by providing a parameter sensitive overlay.

The optical coupling element may comprise at least one grating coupler.

The optical mode may be a waveguide mode, a surface plasmon mode or a combination thereof. The first facet may form an angle different from 90° with respect to a light propagation direction in the at least one optical fiber.

The photonic integrated circuit may be a processed silica die, a processed silicon die, a processed silica-on-silicon die, a processed silicon-on-insulator die, a processed $Al_xGa_{1-x}As$ die, a processed $In_xGa_{1-x}As_yP_{1-y}$ die, a processed metal layer or a combination thereof.

The processed die may have a thickness in the range between 10 nm and 10 µm.

The sensing element may comprise a connection element or intermediate optical element physically attached to the first fiber facet and the photonic integrated circuit may be physically attached to the connection element or intermediate optical element. The photonic integrated circuit may be mounted as a membrane on the connection element or intermediate optical element.

The present invention also relates to a method of manufacturing an optical sensor probe, the method comprising providing at least one optical fiber having a facet, providing a sensing element comprising a photonic integrated circuit, the processing circuit comprising at least one input coupling element for coupling incident light from a predetermined incoupling direction into the photonic integrated circuit, and at least one output coupling element for coupling light out of the photonic integrated circuit into an outcoupling direction wherein the relation between the incoupling direction and the outcoupling direction is different from a relation according to the law of reflection, the incoupling direction and the outcoupling direction being substantially opposite so that retro-reflective operation is obtained, and aligning the coupling element with a core of the at least one optical fiber; and physically attaching the sensing element to the facet. Aligning the coupling element with a core of the at least one optical fiber may comprise an active alignment step.

The present invention also relates to an optical measurement system comprising an optical sensor probe as described above.

The present invention provides an integrated optical circuit or photonic integrated circuit (PIC) or photonic lightwave circuit (PLC), enabling non-specular retro-reflective read-out of the PIC. More specifically, the invention provides PICs comprising at least one signal processing circuit, wherein light incident in a direction of incidence can be coupled into the PIC, the light coupled into the PIC can be processed in the PIC, e.g. in the at least one optical signal processing circuit, and the light processed in the PIC can be coupled out of the PIC in an outcoupling direction that is not related to the direction of incidence of the incident light according to the law of reflection, whereby the outcoupling direction is substantially opposite to the direction of incidence of the incident light. In embodiments of the present invention the PIC can comprise a plurality, e.g. an array, of signal processing units, for example for forming a micro-array sensor. Particular and preferred aspects of the invention are set out in the accompanying independent and dependent claims. Features from the dependent claims may be combined with features of the independent claims and with features of other dependent claims as appropriate and not merely as explicitly set out in the claims. Embodiments of the invention, both as to organization and method of operation, together with features and advantages thereof, will now further be discussed in the detailed description in conjunction with the drawings. The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF THE INVENTION

Figure 1:
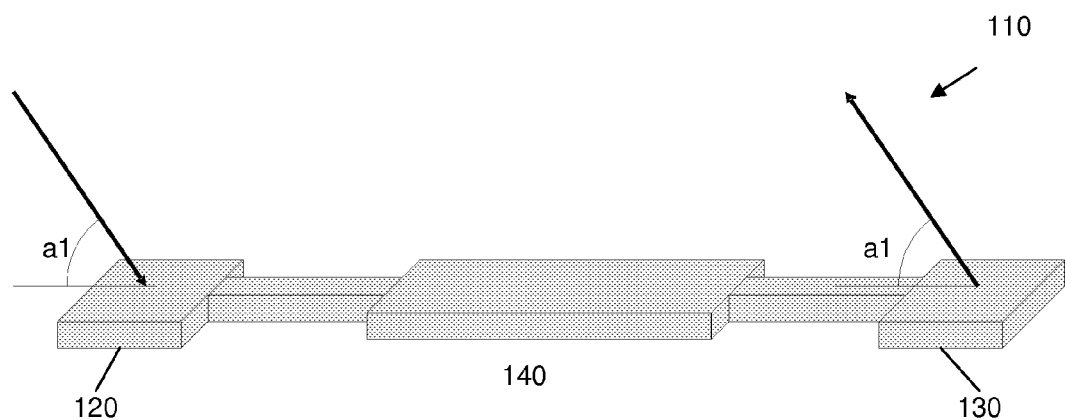
FIG. 1 illustrates conceptually a signal processing unit in which the response from the signal processing unit is in a retro-reflective direction, according to an embodiment of the present invention.

In the following detailed description, numerous specific details are set forth in order to provide a thorough understanding of the invention and how it may be practiced in particular embodiments. However it will be understood that the present invention may be practiced without these specific details. In other instances, well-known methods, procedures and techniques have not been described in detail, so as not to obscure the present invention. While the present invention will be described with respect to particular embodiments and with reference to certain drawings, the reference is not limited hereto. The drawings included and described herein are schematic and are not limiting the scope of the invention. It is also noted that in the drawings, the size of some elements may be exaggerated and, therefore, not drawn to scale for illustrative purposes.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be understood that the term "comprising" should not be interpreted as being restricted to the steps or elements listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B.

In the context of this invention, the terms "radiation" and "light" are used for indicating electromagnetic radiation with a wavelength in a suitable range, i.e. electromagnetic radiation with a wavelength that is not absorbed by the materials used (e.g. the waveguide material), for example electromagnetic radiation with a wavelength between 1 µm and 2 µm, e.g. near infrared radiation (NIR) or short wavelength infrared radiation (SWIR).

The devices and methods of the present invention are further described for the particular case of an SOI (Silicon-on-Insulator) material system. However, the devices and methods of the present invention can be based on other material systems, such as for example III-V material systems, metallic layers, low index contrast material systems such as glass or silica-based systems, or a combination thereof. Where reference is made to low refractive index materials, reference may be made to material systems wherein the difference in refractive index, e.g. between a cladding material and a core material, is limited to less than 1, e.g. to one or a few tenths of a refractive index unit.

In the context of the present invention, the term "coupling element" is an element for coupling light that is incident on the coupling element to a waveguide mode or a surface plasmon mode of e.g. a PIC and vice versa. A "fiber-to-waveguide coupler" is a coupling element that converts an optical fiber mode into a waveguide mode or surface plasmon mode to be guided and processed by e.g. a PIC and vice versa. For example, the coupling element can be a grating coupler that diffracts incident light into a waveguide mode and/or diffracts the waveguide mode out of the PIC. The grating coupler can for example comprise a one-dimensional grating or a two-dimensional grating that may be suitable for a polarization diversity circuit scheme. The grating coupler can comprise a curved grating for e.g. focusing the coupled light into an optical component.

In the context of the present invention, the term "specular reflection" is used to indicate reflection at a surface according to the law of reflection, in which light from a single incoming direction is reflected into a single outgoing direction, with the direction of the incoming light (the incident ray), and the direction of outgoing light (the reflected ray) make the same angle with respect to the surface normal, with the reflected ray lying in the input plane (the input plane being a plane defined by the incident ray and the surface normal). Thus, in specular reflection, the angle of incidence equals the angle of reflection.

In the context of the present invention, "non-specular reflection" is used to indicate reflection at a surface in which light from a single incoming direction is effectively reflected into a single outgoing direction, wherein the direction of the incoming light (the incident ray), and the direction of outgoing light reflected (the reflected ray) are not governed by the law of reflection. (As the person of skill in the art will recognize, this need not occur through a purely optically-reflective process; diffraction and refraction can be used to provide this effective reflection.) In the context of the present invention, the term "non-specular reflection" is also used to indicate a situation wherein light incident on and coupled into a photonic integrated circuit from a single incoming direction (incoupling direction) is coupled out of the photonic integrated circuit (e.g. after processing) into a single outgoing direction (outcoupling direction) at a same side of the photonic integrated circuit, wherein the incoupling direction and the outcoupling direction, as determined with respect to the normal to an average surface plane of the photonic integrated circuit, are not related by the law of reflection.

In the context of the present invention, the term "photonic integrated circuit" (PIC) is used to indicate an optical element or device that integrates multiple photonic functions. The functions can be passive (e.g. guiding, splitting, interfering) or active (e.g. amplification, generation, detection). A PIC can be based on a variety of material systems, such as for example low-index contrast material systems or waveguide platforms (e.g. polymer waveguides, glass/silica waveguides, $Al_xGa_{1-x}As$ waveguides, $In_xGa_{1-x}As_yP_{1-y}$ waveguides), high-index contrast waveguides (e.g. Silicon-on-Insulator, semiconductor membranes), plasmonic waveguides (e.g. metal nano-particle arrays, metal layers). The term "optical component" is used to indicate patterns with a specific functionality. A PIC comprises at least one integrated optical component realizing an optical function, such as for example integrated optical cavities, integrated optical resonators, integrated optical interferometers, integrated optical couplers, waveguides, gratings or a combination thereof. The components can be active or passive. The components can be integrated for example monolithically, heterogeneously or hybridly. Given their small size, PICs and PIC components offer numerous benefits such as the potential for the development of miniaturized, compact and robust elements, and prospect of mass fabrication of multiple circuits on one chip or dense multiplexing, e.g. micro-array sensors.

In the context of the present invention, the term "fiber" is used to indicate an optical fiber selected from the group consisting of plastic, glass, quartz and silica fibers. The fiber can be doped, e.g. it can be an erbium-doped fiber. The fiber can be a single-mode or a multi-mode fiber. The fiber can be polarization maintaining.

Silicon-on-Insulator is a very interesting material system for highly integrated photonic circuits. The high refractive index contrast allows photonic waveguides and waveguide components with submicron dimensions to guide, bend and control light on a very small scale so that various functions can be integrated on a chip. Moreover SOI offers a flexible platform for integration with surface plasmon based components which in turn allows for even higher levels of miniaturization. For both waveguide types the mode distribution of the guided modes is such that a substantial portion of the light is concentrated outside the core material, thus making them suitable for sensitive detection of environmental changes. Both waveguide types allow a high level of miniaturization, which may be advantageous. Furthermore, for both waveguide types light can be efficiently coupled in and out the PIC by use of e.g. a grating coupler or another coupling element.

Using Silicon-on-insulator also has some technological advantages. Due to the CMOS industry, silicon technology has reached a level of maturity that outperforms any other plane chip manufacturing technique by several orders of magnitude in terms of performance, reproducibility and throughput. Nano-photonic ICs can be fabricated with wafer scale-processes, which means that a wafer can contain a high amount of photonic integrated circuits. Combined with the commercial availability of large wafers at a relative moderate cost, this means that the price per photonic integrated circuit can be very low.

In certain embodiments, the present invention provides a photonic integrated circuit (PIC) that enables retro-reflective read-out. More specifically, embodiments of the invention can provide PICs wherein light incident in a direction of incidence can be coupled into the PIC, the light coupled into the PIC can be processed in the PIC and the light processed in the PIC can be coupled out of the PIC in an outcoupling direction that is not related to the direction of incidence of the incident light according to the law of reflection, but wherein the outcoupling direction is substantially opposite to the direction of incidence of the incident light. In certain embodiments of the invention, the outcoupling direction is related to the direction of incidence by neither the law of reflection nor Snell's law.

A PIC according to embodiments of the present invention may comprise at least one signal processing circuit 110 comprising one or more coupling elements 120, 130 or structures adapted for exchanging optical power within a predetermined wavelength range with optical waves in the environment, such as for example optical power transmitted through free space or by an optical fiber. The at least one signal processing circuit comprises at least one coupling structure 120, 130 or coupling element which couples the incident light with a predefined wavelength spectrum to the photonic integrated circuit, and/or can send light from the photonic integrated circuit back into the environment. In embodiments of the present invention the coupling element 120, 130 may be direction-sensitive. The coupling element 120, 130 can for example be based on an open end waveguide, capturing light in its angular aperture and vice-versa. Alternatively, the coupling element 120, 130 can comprise a grating coupler, diffracting light with a wavelength in a predetermined wavelength range and with a predetermined incident angle into a planar waveguide and vice-versa. The at least one signal processing unit 110 or circuit comprises at least one photonic integrated component 140 (e.g., waveguide, interferometer, filter, resonator) for processing light received through the at least one coupling element 120. After processing of the light, the resulting light signal or response is returned to the environment by use of at least one coupling element 130. In embodiments of the present invention the at least one coupling element 130 used for coupling light from the photonic integrated circuit into the environment (further referred to as output coupling element) can be the same as the at least one coupling element 120 used for coupling light from the environment into the photonic integrated circuit (further referred to as input coupling element). In embodiments of the present invention the at least one output coupling element 130 can be an element different from the at least one input coupling element 120. The at least one photonic integrated component 140 determines the functionality of the photonic integrated circuit and can for example comprise a filter, as illustrated in FIG. 1, or any other suitable optical component or combination of optical components. At least one optical component 140, e.g. filter, can be provided for each input coupling element or for each output coupling element. Alternatively, a single optical component 140, e.g. filter, can be provided for all input coupling elements (as e.g. illustrated in FIG. 3) or a single optical component 140, e.g. filter, can be provided for all output coupling elements. Combinations of both concepts are possible, wherein for example more than one optical component 140 is provided, each optical component being connected to a plurality of input/output coupling elements.

In embodiments of the present invention the photonic integrated circuit can comprise a plurality, e.g. an array, of optical signal processing units 110, for example for forming a microarray sensor.

In embodiments of the present invention, the outcoupling direction of the light coupled out of the photonic integrated circuit, i.e. the direction with respect to the normal to an average surface plane of the planar photonic circuit of the light coupled out, is not related by the law of reflection to the incoupling direction of the light coupled into the photonic integrated circuit, i.e. the direction with respect to the normal to an average surface plane of the planar photonic circuit of the incident light.

In certain embodiments of the invention, neither the incoupling nor the outcoupling direction is in the plane of the PIC. For example, in such embodiments of the invention, the incoupling and outcoupling can be achieved at an angle to the plane of the PIC using one or more grating structures. In certain embodiments of the invention, neither the incoupling nor the outcoupling is achieved using a optical fiber abutted against an edge face of the PIC.

Figure 2:
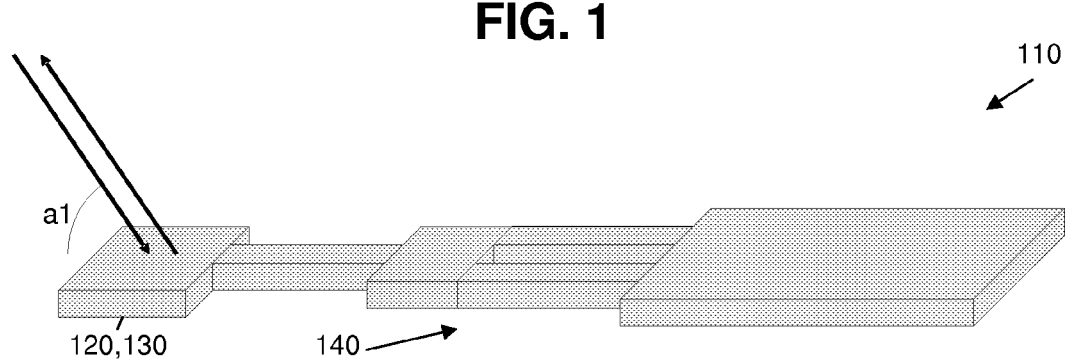
FIG. 2 illustrates an alternative preferred embodiment in which the response from the signal processing unit is sent back in a retro-reflective direction.

According to embodiments of the present invention, the design, implementation and application of the device may comprise retro-reflective operation, as illustrated in FIG. 1 and FIG. 2. With retro-reflective operation it is indicated that light incident from an incoupling direction is coupled into the photonic integrated circuit by use of a coupling element 120, the light is processed by the optical signal processing circuit, and the processed light is sent back to the environment into an outcoupling direction that is substantially opposite to the incoupling direction (and its angular surroundings). In other words, after processing, the light is sent back into the direction it originated from. It is an advantage of this embodiment that an observer at or near the location of the origin of the incident wave can capture the response of the device, irrespective of its orientation with respect to the observer. The latter provides a number of applications, such as for example remote sensing and fiber-probe sensing.

Figure 3:
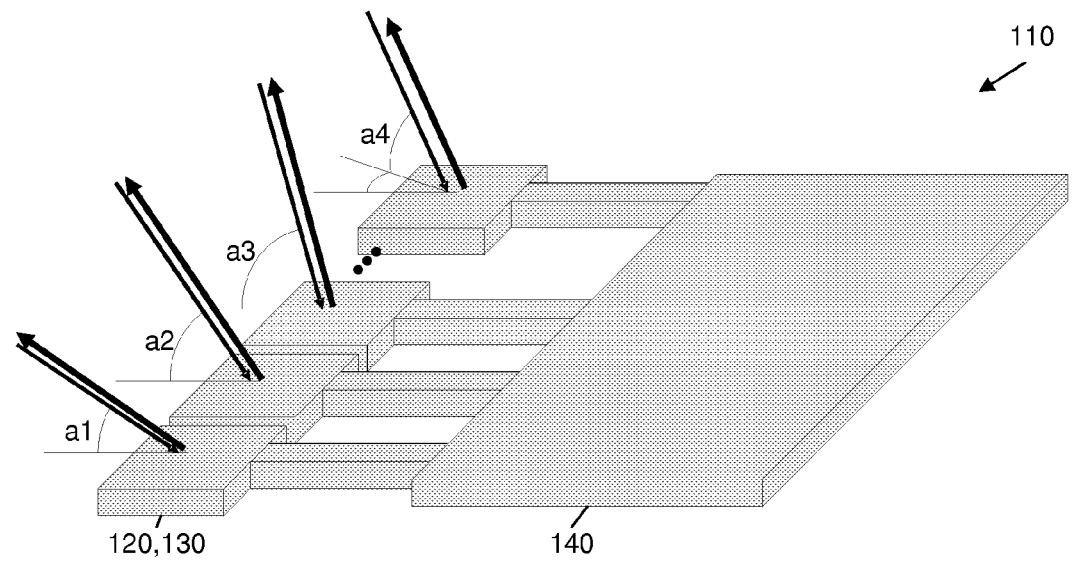
FIG. 3 illustrates a preferred embodiment of a PIC with a plurality of signal processing units, enabling a retro-reflective response independent of the incidence direction.

In embodiments of the present invention, the response of the photonic integrated circuit may be substantially independent of the incoupling direction of the light. To that end, the photonic integrated circuit may comprise a plurality of input couplers 120, each coupler 120 being optimized to cover a specific range of angles of incidence. The couplers 120 can then be connected to a single optical element 140, e.g. filter, as illustrated in FIG. 3, or the couplers can be connected to separate substantially identical optical elements, e.g. filters, which enables to produce substantially the same response for each coupler. Alternatively, a plurality of PICs enabling retro-reflective operation for one angle of incidence (and its angular surroundings) may be attached to a spherical or multifaceted carrier, in such a way that a large range of angles of incidence (i.e. a large range of incoupling directions) can be covered. In still another embodiment, a plurality of PICs enabling retro-reflective operation for one angle of incidence (and its angular surroundings) can be embedded in a medium with a random orientation, wherein the number of PICs is sufficiently high to provide a statistically significant probability of covering a large range of angles of incidence. This embedding can be static, in which the PICs are in fixed positions at fixed angles. This embedding can be dynamic, wherein the position and angles of the devices are not fixed. In the latter case, the statistical coverage of the angles of incidence is also influenced by the time of observation.

In practical applications of devices or systems based on photonic integrated circuits according to the present invention, the device can be illuminated with an incident light beam, for example an incident light beam with a diameter in the range between 1 µm to 100 mm. Optical read-out may be done for a plurality of wavelengths of the incident light (wavelength scanning) and/or for a plurality of incident angles (angular scanning). Within a wavelength range of interest, e.g. 10 nm to 300 nm around a central wavelength, wavelength scanning and detection can for example be done at a resolution of e.g. 0.01 nm or less than 0.01 nm. Within an angle range of interest, angular scanning can for example be done at a resolution of 0.0001 degrees. The incident light rays may be collimated, preferably within about 0.002 degrees. The light source providing the incident light beam may be either substantially non-coherent, e.g. a tungsten-halogen lamp, a light-emitting diode, or it may be substantially coherent, e.g. a laser. For wavelength scanning, the light source may e.g. be a broad band light source in combination with a scanning wavelength dispersive device, or a tunable light source.

The at least one coupler structure 120, 130 or coupling element or coupler is part of the at least one signal processing circuit. It exchanges optical power between optical waves present in the environment of the device of the present invention with optical waves in the photonic integrated circuit, e.g. in a planar waveguide. This waveguide may interface with an optical element 140, e.g. filter. The coupler 120, 130 or coupling element is preferably designed to function within the entire wavelength range of interest. The coupler 120, 130 may be direction-sensitive, and may be designed to couple light between the environment and the photonic integrated circuit only within a predetermined range of incident angles. The coupler 120, 130 can in certain embodiments of the invention be based on an open-ended waveguide capturing light propagating within its angular aperture, and vice-versa emitting light in the same direction. In other embodiments of the invention, the coupler 120, 130 can for example comprise a planar diffractive structure designed to diffract light of a predetermined wavelength range from a predetermined incident angle into a planar waveguide and vice-versa. The grating coupler 120, 130 can comprise a one-dimensional grating or a two-dimensional grating coupler suitable for a polarization diversity circuit scheme. The grating coupler 120, 130 can comprise a curved grating for e.g. focusing the coupled light into an optical component.

In a preferred embodiment based on two-dimensional grating couplers 120, 130, polarized light incident from an incoupling direction is coupled into the circuit by a two-dimensional grating coupler, the light is processed by the optical signal processing circuit, and the processed light is coupled out into the environment by a two-dimensional grating retro-reflectively.

The at least one signal processing circuit 110 of a photonic integrated circuit according to the present invention comprises at least one integrated optical component 140, such as for example integrated optical cavities, integrated optical resonators, integrated optical interferometers, integrated optical couplers, waveguides, gratings or a combination thereof. The at least one signal processing unit processes the light coupled into the circuit. It may be implemented as a planar waveguide circuit with a waveguide port for each coupler attached to the circuit. The at least one optical component 140 determines the functionality of the at least one signal processing unit 110. For example, the function of an optical element 140 such as a filter can be to modify the wavelength spectrum of the incident light, for example to encode information. The resulting spectrum, i.e. the spectrum of the light beam after processing by the signal processing unit, is coupled into the environment by use of an output coupler. The encoded information can for example be used for identification applications, e.g. for identification of a device, or for example for environmental parameter monitoring. The information can be encoded in various ways, such as for example spectral modification or intensity modification.

In embodiments of the present invention the incident signal can be sent back unmodified, which can for example be used to identify the presence of a device. Alternatively a number of wavelengths or narrow wavelength ranges can be isolated from the incident signal, for example for identification of an object. Either the dropped wavelengths or the original signal minus the dropped wavelengths can be sent to the output, or to different outputs. The set of dropped wavelengths can be made unique for each device, which allows identifying a device and thus an object to which the device is attached. This method can also be used for sensing applications, wherein the set of dropped wavelengths or the exact spectral position of the wavelengths can be made sensitive to aspects of the environment.

Below different applications are described wherein a photonic integrated circuit with retro-reflective read-out according to embodiments of the present invention can be advantageously used. However, the photonic integrated circuit of the present invention can be used in other applications known by a person skilled in the art.

Figure 4:
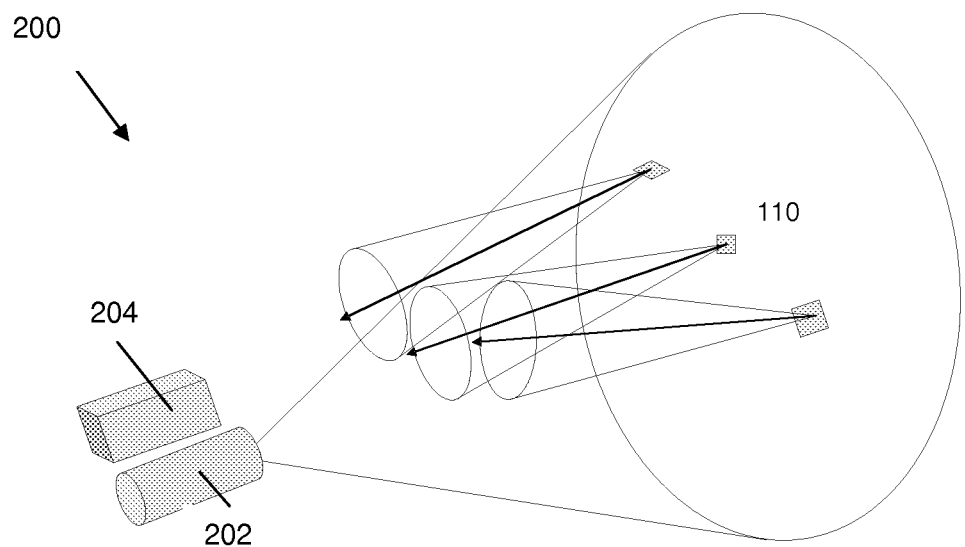
FIG. 4 illustrates a non-specularly reflective PIC used as e.g. an infrared identification or marker chip, wherein the marker chip is a direction-insensitive retro-reflective PIC remotely read-out by a combined laser-detector system, according to an embodiment of the present invention.
Figure 5:
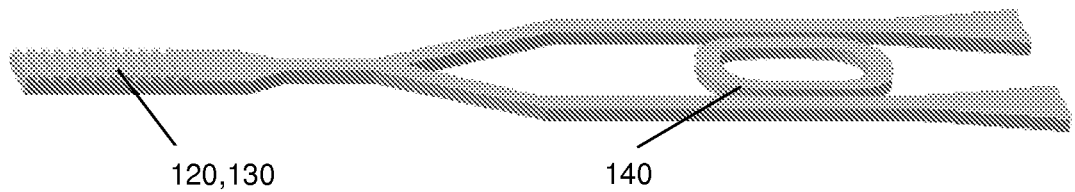
FIG. 5 illustrates an embodiment of a retro-reflective optical signal processing unit, according to an embodiment of the present invention.

In a first application (illustrated in FIG. 4), the retro-reflective PIC is e.g. used as an infrared identification or marker chip. More specifically, the marker chip thus can be a direction-insensitive retro-reflective PIC. The identification system 200 comprises a tuneable infrared light source 202, an infrared camera 204 and a plurality of passive PICs according to the present invention, attached to the objects in the scene to be identified. The infrared light source 202 may sweep in the infrared wavelength range, e.g. around 1500 nm, a predefined range of wavelengths, e.g. 50-100 nm, with a predetermined resolution, e.g. 0.01-0.1 nm. The camera may provide an image for every wavelength in the wavelength scan. The PIC may be a miniaturized chip, e.g. a silicon-on-insulator chip. The PIC comprises at least one signal processing circuit 110 comprising a planar optical waveguide circuit and comprising one or more coupling elements 120, 130 or structures adapted for exchanging optical power within a predetermined wavelength range with optical waves in the environment. An example of such a retro-reflective optical processing unit and the coupler 120, 130 is shown in FIG. 5. The PIC may comprise a plurality of signal processing circuits 110, for example it may comprise 120 signal processing circuits. Every signal processing circuit 110 may comprise e.g. one coupling structure or coupling element which couples the free-propagating incident light with the predetermined broad wavelength spectrum to a filter on the chip, and can send light from the filter back into the same direction, and its angular surroundings. The coupler of the present example is direction-sensitive. The coupler 120, 130 can be e.g. a focussing grating coupler, which may result in efficient coupling. The filter 140 can comprise e.g. at least one ring resonator, which enables extreme miniaturisation. The coupler 120, 130 and filter 140 can be connected by use of e.g. a directional coupler. In another embodiment each signal processing circuit may comprise e.g. two coupling structures 120, 130. The filter 140 can be connected to both coupling structures, and e.g. a directional coupler may not be needed in this case. The second coupling structure 130 couples the light from the filter out of the PIC into the environment in substantially the same direction as the direction of light incidence (retro-reflective operation). The plurality of retro-reflective signal processing circuits on the PIC are preferably designed to operate spectrally substantially identical but for a different angle of incidence. The operation angles of the respective signal processing circuits can be selected such that the full angular range of interest is covered when combining all signal processing circuits. The degree of miniaturization and integration of the couplers 120, 130 and optical components 140 on the PIC enables the PIC to produce an integrated response, i.e. the collimated light beam can illuminate the plurality of couplers, e.g. all 120 grating couplers. For a given angle of incidence, only one of the signal processing units 110 may efficiently couple the incident light to the optical component 140, e.g. filter, and the light processed by the optical component 140 may be coupled out by e.g. a second grating coupler 130 to a detector array. The image on the detector array may show a bright spot when one of the markers is at resonance. The corresponding wavelength or wavelengths of the light corresponding to this lighting up may identify the object. The coordinates of the light spot in the image, combined with the angular coordinates of the light source 202 and detector 204, can be used for locating the object in the scene.

The person of skill in the art will recognize that the application described above is not limited to PICs combining 120 single signal processing circuits, and, that depending on the desired angular range and resolution of the application, more or less circuits can be combined on the PIC.

Figure 6:
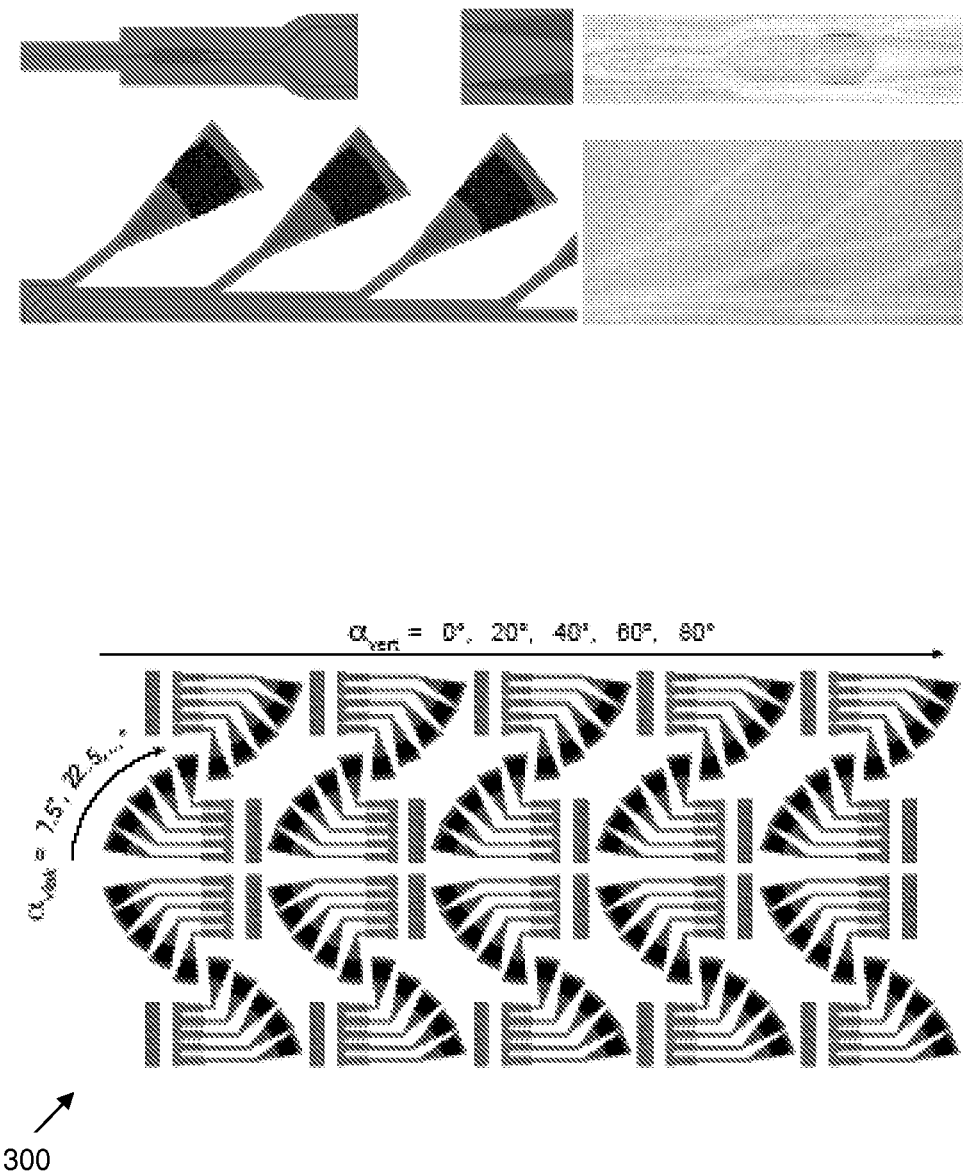
FIG. 6 illustrates a detailed view and overall view of an example of a multiplexed signal processing unit array, enabling direction insensitive read-out in a wide range of incoupling directions, according to an embodiment of the present invention.

An example of a marker-based sensor 300 with a multiplexed signal processing unit array, enabling direction insensitive read-out in a wide range of incoupling directions, that could be used for sensing, is shown in FIG. 6.

All single signal processing units on the PIC can have a substantially identical spectral behaviour for their respective angles of incidence. To this end, standard processing of PICs can be combined with a trimming after-care treatment to adjust e.g. the filter characteristics of the single signal processing circuits, which can be different due to wafer-scale non-uniformities. E.g. trimming of silicon ring resonators by electron beam induced compaction and strain can be used (Optics Express, 16(6), pp. 3738-3734, 2008). By trimming the respective filters, their spectral behaviour can be substantially equalized.

A second application wherein a non-specular retro-reflective PIC according to the present invention can be advantageously used is remote sensing of e.g. stress, pressure, strain, torque, vibrations, acoustic waves, temperature, magnetic/electric field, ionizing radiation, biological systems, chemicals, biochemical reactions, drugs, proteins or a combination thereof, and/or in applications of environmental sensing or for process monitoring and control. The sensor may comprise a direction-insensitive retro-reflective PIC. The sensing system may comprise a tuneable infrared light source, an infrared detector and a passive PIC with sensor functionality, e.g. a chemically functionalised chemical sensor or a bare stress sensor or a biologically functionalised biosensor. The infrared light source may sweep in the infrared wavelength range, e.g. around 1500 nm, a predefined range of wavelengths, e.g. 50-100 nm, with a predetermined resolution, e.g. 0.01-0.1 nm. The detector may register for every wavelength in the wavelength scan the retro-reflected light. The light source and the detector can e.g. be configured in a single device, e.g. a handheld device. The PIC may be a miniaturized chip, e.g. a silicon-on-insulator chip. The PIC comprises at least one signal processing circuit comprising a planar optical waveguide circuit and comprising one or more coupling elements or structures adapted for exchanging optical power within a predetermined wavelength range with optical waves in the environment. The PIC may comprise a plurality of signal processing circuits. Every signal processing circuit may comprise e.g. one coupling structure or coupling element which couples the free-propagating incident light with the predetermined broad wavelength spectrum to a filter on the chip, and can send light from the filter back into the same direction, and its angular surroundings. The coupler is direction-sensitive. The coupler can be e.g. a focussing grating coupler, which may result in efficient coupling. The filter can comprise e.g. at least one ring resonator, which enables extreme miniaturization. Depending on the environmental parameter to be measured or sensed, the e.g. ring resonator can be functionalized to interact with the parameter to be sensed. In other embodiments, micro-fluidics can be foreseen to efficiently bring e.g. an analyte to be sensed to the sensor surface. The coupler and filter can be connected by a directional coupler. In another embodiment each signal processing circuit may comprise e.g. two coupling structures. The filter can be connected to both coupling structures, and e.g. a directional coupler may not be needed in this case. The second coupling structure couples the light from the filter out of the PIC into the environment in substantially the same direction as the direction of light incidence (retro-reflective operation). The plurality of retro-reflective signal processing circuits on the PIC are preferably designed to operate spectrally substantially identical but for a different angle of incidence. The operation angles of the respective signal processing circuits can be selected such that the full angular range of interest is covered when combining all signal processing circuits. The degree of miniaturization and integration of the couplers and optical components on the PIC enables the PIC to produce an integrated response, i.e. the collimated light beam can illuminate the plurality of couplers. For a given angle of incidence, only one of the signal processing units may efficiently couple the incident light to the optical component, e.g. filter, and the light processed by the optical component may be coupled out by e.g. a second grating coupler to a detector array. The detector may be illuminated when one of the markers is at resonance. The corresponding wavelength or wavelengths of the light corresponding to this lighting up may supply the information needed to characterize the parameters to be sensed. The PIC according to the present invention enables retro-reflective remote read-out of optical sensors.

Figure 7:
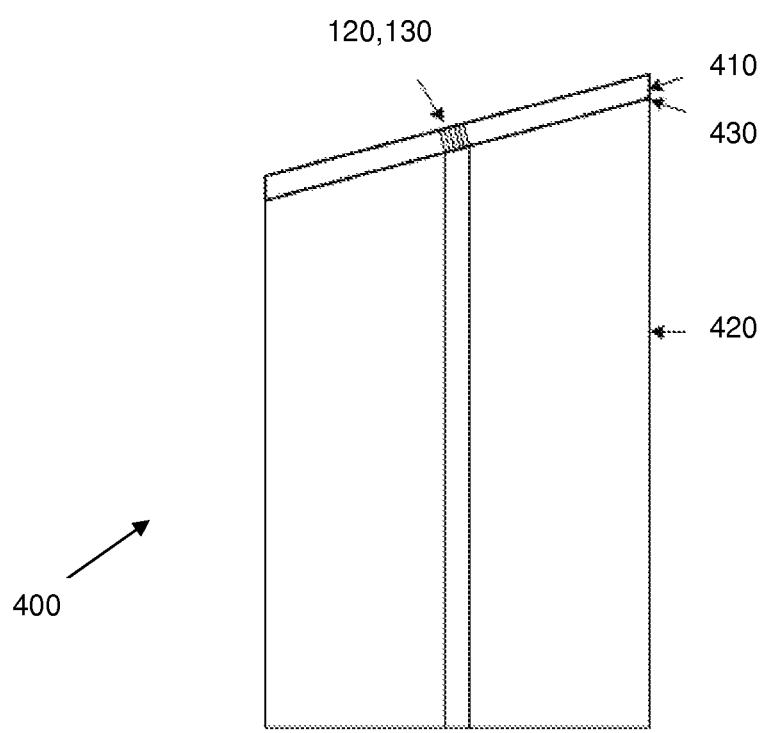
FIG. 7 illustrates an optical sensor probe comprising a PIC physically attached to a facet of an optical fiber.

A third application illustrates the use of a non-specular reflective PIC according to the present invention in an optical sensor probe 400 as illustrated in FIG. 7. In this application, the PIC 410 is a retro-reflective PIC. An optical sensor probe 400 may be used for sensing one or more parameters. It comprises an optical fiber 420 having an end surface or facet, wherein a sensing element comprising a photonic integrated circuit 410 is physically attached to the facet and wherein one or more coupling elements 120, 130 or structures are provided for coupling light between the optical fiber 420 and the photonic integrated circuit 410. On the photonic integrated circuit 410, one or more structures are provided for guiding light as optical modes or resonances. The photonic integrated circuit 410 comprises at least one optical component 140 being adapted for generating an optical response to an external parameter, thereby providing information regarding a parameter or parameters to be sensed. This information can be provided for example in the form of a change in intensity, phase, polarization, frequency, resonance frequency, or spectrum. This optical sensor probe 400 combines the performances of fiber sensors, i.e. enabling tight contact between the environment and the sensing element, with the performances of PIC based optical sensors, i.e. highly sensitivity, flexibility, multidimensionality and capability of multi-parameter sensing. The PIC which is used for the optical sensor probe is a retro-reflective PIC according to embodiments of the present invention.

Figure 8:
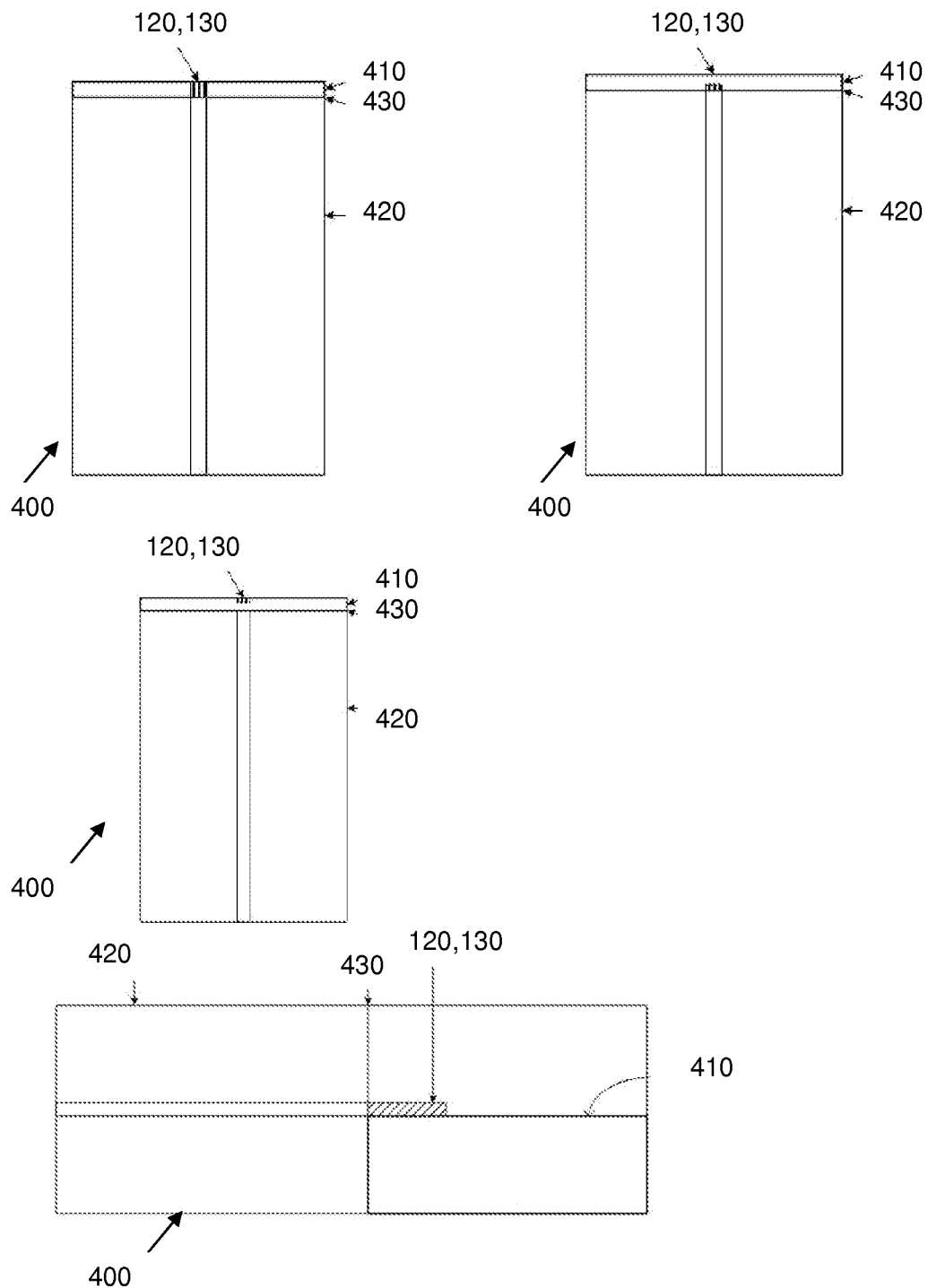
FIG. 8 illustrates the principle of an optical sensor probe according to embodiments of the present invention.

In the accompanying description, the optical sensor probe 400 of the present invention is mostly described for the case where the sensing element consists of a photonic integrated circuit 410. However, the sensing element can comprise other elements, such as for example a connection element 430 or other elements, in addition to a photonic integrated circuit. By way of illustration some more detailed information regarding embodiments of the optical sensor probe 400 will be provided. An optical sensor probe 400 according to one embodiment of the present invention is schematically illustrated in FIG. 8. It comprises an optical fiber with a facet and a bare (i.e. non-packaged) photonic integrated circuit physically attached to the facet. The photonic integrated circuit attached to the fiber facet comprises one or more coupling elements or structures adapted to couple light between the optical fiber and the photonic integrated circuit and comprises one or more light-guiding structures adapted to guiding light as optical modes. The photonic integrated circuit is furthermore adapted to modify the light propagating in the circuit as a response to an external parameter or external parameters, thereby providing information regarding the external parameter or parameters. Physical attachment of the photonic integrated circuit to the fiber facet can be realized, for example, by use of an adhesive, an epoxy, by direct wafer bonding or by polyimide bonding.

As illustrated in FIG. 8, the one or more coupling elements or structures adapted to couple light between the optical fiber and the photonic integrated circuit may comprise a light coupling element that may be positioned at different positions with respect to the interface or joint between the photonic integrated circuit and the optical fiber, as long as it is substantially located in the optical path of light leaving or entering the optical fiber core. The photonic integrated circuit can be attached to the optical fiber facet with an upper surface, a lower surface or a side surface oriented towards the facet. In certain embodiments of the invention, the photonic integrated circuit is attached to the optical fiber facet with its upper surface or lower surface oriented toward the facet. For example, the axis of the optical fiber is desirably not substantially parallel to the plane of the PIC. For example, the axis of the optical fiber can form an angle in the range of 10°-90°, 20°-90°, or even 30°-90° with the plane of the PIC.

Depending on the application, the size (e.g. diameter, length, width) of the photonic integrated circuit in a plane parallel to the plane of the fiber facet may be preferably smaller than about 1 mm, smaller than about 250 µm, or even smaller than about 125 µm. For example, the size of the photonic integrated circuit in a plane parallel to the plane of the fiber facet can be smaller than the diameter of the optical fiber including any jacketing or cabling materials. In other embodiments of the invention, the size of the photonic integrated circuit in a plane parallel to the plane of the fiber facet can be smaller than the diameter of the cladding of the fiber. Photonic integrated circuits have reached a level of miniaturization that allows them to fit onto a single mode optical fiber facet. The person of skill in the art will recognize that for some applications, such as for example in case of a flow sensor, it may be preferable to use a photonic integrated circuit with a size (e.g. diameter, length, width) that is larger than the cladding diameter of the fiber.

In certain embodiments of the present invention, the photonic integrated circuit comprises one or more coupling elements or structures adapted for coupling light between the optical fiber and the photonic integrated circuit. Such coupling elements or structures may comprise a light coupling element, e.g. a fiber-to-waveguide coupler, such as for example a grating coupler. The photonic integrated circuit may furthermore comprise at least one photonic integrated component. The photonic integrated circuit also may be surrounded partly by supporting material.

Figure 9:
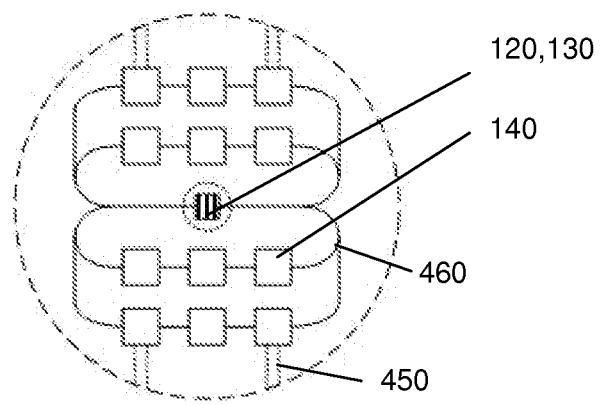
FIG. 9 illustrates schematically a PIC that may be attached to an optical fiber facet in embodiments of the present invention.

FIG. 9 schematically illustrates a top view of a photonic integrated circuit (PIC) that may be coupled to the fiber facet. The PIC illustrated in FIG. 9 comprises a light coupling element 120, 130 and a plurality of photonic integrated components 140, wherein the photonic integrated components may for example have a sensor function or a logical function. Active integrated components on the PIC may require electrical interconnects 450. As these electrical interconnects are part of the photonic integrated circuit, electrical contact pads may also be present on the fiber facet. The light coupling element or fiber-to-waveguide coupler may couple light from the optical fiber (the outer boundaries of the optical fiber facet are indicated by a dashed line in FIG. 9) into the PIC attached to the optical fiber facet. In the PIC the light may be guided via an optical lightpath 460 by use of waveguide modes or surface plasmon modes to the photonic integrated components 140. Vice-versa, the light coupling element or fiber-to-waveguide coupler may couple light that is propagating in-plane (i.e. in a plane that is substantially parallel to the average surface plane of the PIC) in the PIC to an out-of-plane direction (i.e. in a direction that is not in a plane substantially parallel to the average surface plane of the PIC). This out-of-plane direction into which the light from the PIC is coupled by the light coupling element is preferably substantially the same as the direction of the longitudinal axis of the optical fiber (corresponding to the light propagation direction in the optical fiber) to which the PIC is attached. In embodiments of the present invention, the optical fiber to which light is coupled from the PIC may be the same as the optical fiber from which the light has been coupled into the PIC.

Depending on the application of the optical sensor probe, the photonic integrated components on the photonic integrated circuit can comprise for example photonic waveguide structures, photonic crystal structures, filters, wires, interferometers, ring resonators, cavities, mirrors, splitters, detectors, sources, delay lines working in a specific wavelength range. Other photonic components known by a person skilled in the art may be used. The material system used for fabricating the photonic integrated circuit may e.g. depend on the application and can preferably comprise silicon, silicon-on-insulator, silica-on-insulator, glass, polymer, $Al_xGa_{1-x}As$, $In_xGa_{1-x}As_yP_{1-y}$, metal. Other suitable material systems known by a person skilled in the art may be used. The photonic integrated circuit may be a very thin die, for example a die with a thickness in the range between 10 nm and 10 µm.

Figure 10:
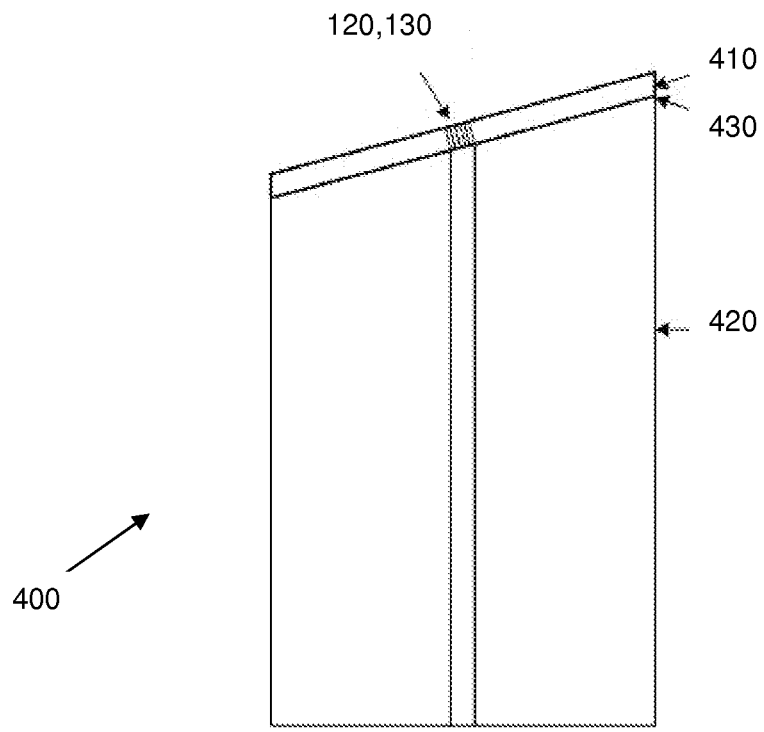
FIG. 10 illustrates an optical sensor probe according to the present invention wherein the optical fiber has an angled facet.
Figure 11:
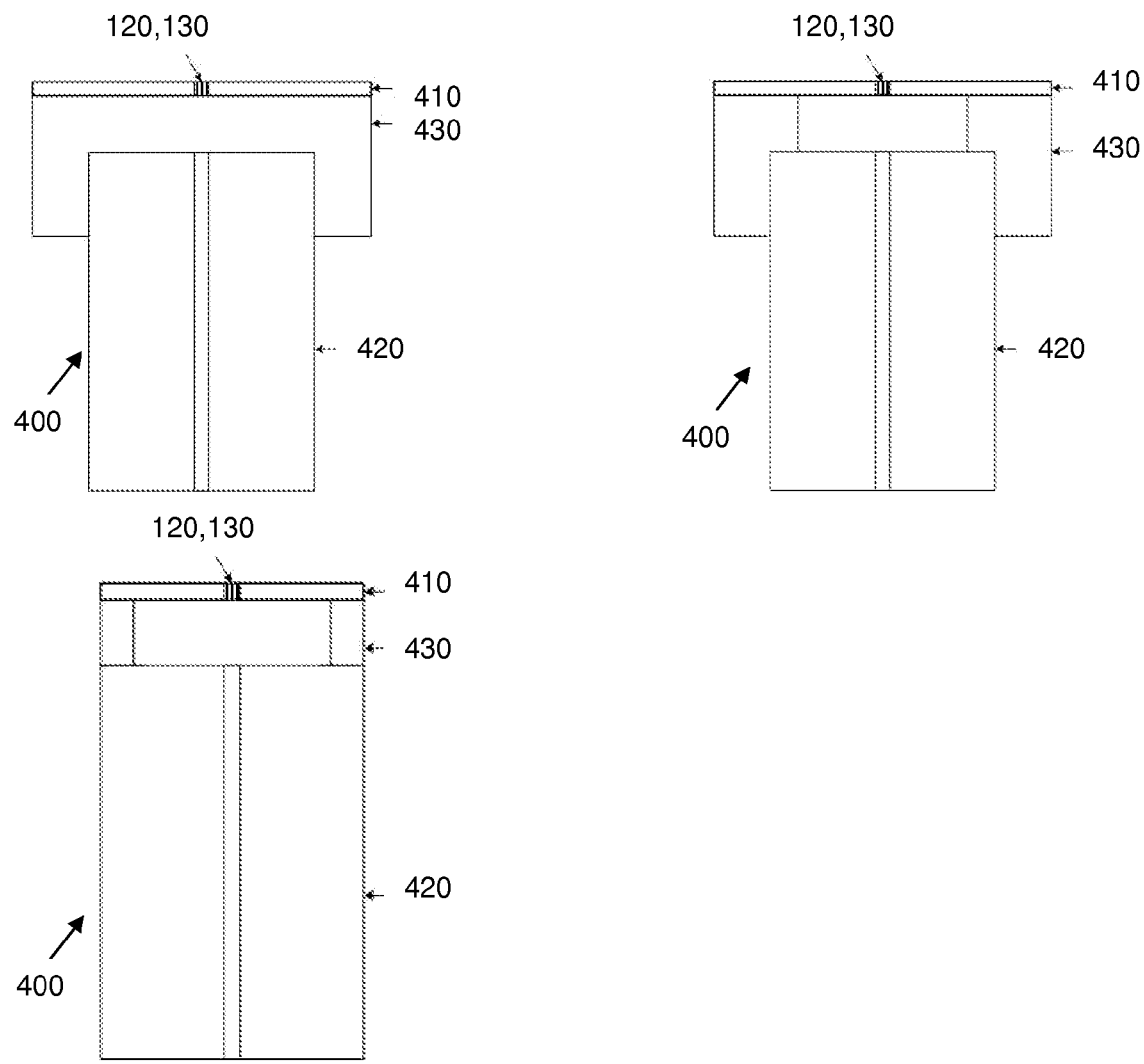
FIG. 11 illustrates an optical sensor probe according to the present invention with an intermediate optical element in between the fiber facet and the PIC.

In embodiments of the present invention a fiber with a straight facet (i.e. a facet that is substantially perpendicular to the light propagation direction in the fiber) or a fiber with an angled facet (i.e. a facet that forms an angle different form 90° with respect to the light propagation direction in the fiber), as illustrated in FIG. 10, may be used. The connection element 430 may be a full connection element, or a connection element with a cavity. Furthermore a fiber may be used that comprises a cavity or a hole near or at the fiber facet, e.g. by etching or patterning. As illustrated in FIG. 11, a connection element may be provided in between the fiber facet and the photonic integrated circuit. More in particular, the PIC may for example be mounted e.g. as a membrane on/over the cavity at the fiber facet or on the intermediate optical element. The PIC thus may be a suspended membrane PIC, suspended above a cavity In embodiments of the present invention the photonic integrated circuit comprises a retro-reflective signal processing circuit. A retro-reflective signal processing circuit may preferably be used in embodiments wherein the optical fiber to which light is coupled from the PIC is the same as the optical fiber from which light is coupled into the PIC. In case of a retro-reflective signal processing circuit, light coupled from the optical fiber into the PIC by use of a fiber-to-waveguide coupler is processed by the circuit and sent back into the same optical fiber by use of the same fiber-to-waveguide coupler used for incoupling of light.

It will be clear that embodiments of the present invention also may include embodiments where the fiber is a fiber array, the latter being encompassed when the term fiber is used.

Three different methods that may be used for fabricating an optical sensor probe according to the present invention are described below. However, other suitable methods known by a person skilled in the art may be used. An important aspect of each fabrication method is the alignment of the fiber-to-waveguide coupler to the fiber core, e.g. the single mode fiber core. Different alignment methods that may be used are further described. However, other alignment methods known by a person skilled in the art may be used.

A first method that may be used for fabricating an optical sensor probe according to the present invention comprises the fabrication of the photonic integrated circuit directly on the fiber facet. The different layers of material (e.g. silicon, metal) for forming the circuit may be provided, e.g. deposited (e.g. evaporated, plasma deposited) directly onto the fiber facet. The circuit may then be defined in these layers of material by use of lithography (e.g. e-beam lithography, focused ion beam etching, laser beam ablation or etching, nanoimprint lithography, (laser-assisted) direct imprinting, DUV lithography, optical contact lithography, etc.) using the fiber facet as a substrate. This method preferably includes an alignment procedure for aligning the fiber-to-waveguide coupler to the fiber core. A passive alignment procedure may be used, for example comprising a step in which the contour of the fiber facet is used to locate the position of the fiber core. Alignment markers may be defined on the fiber facet. These alignment markers can be used to align a mold or a lithography mask to the fiber core. Alternatively, instead of using alignment markers, the fiber core itself can be used for aligning a mold or a lithography mask to the fiber core. The alignment markers or the fiber core may also be used to control the position of an ion or electron beam before starting an actual circuit writing or etching process.

Figure 12:
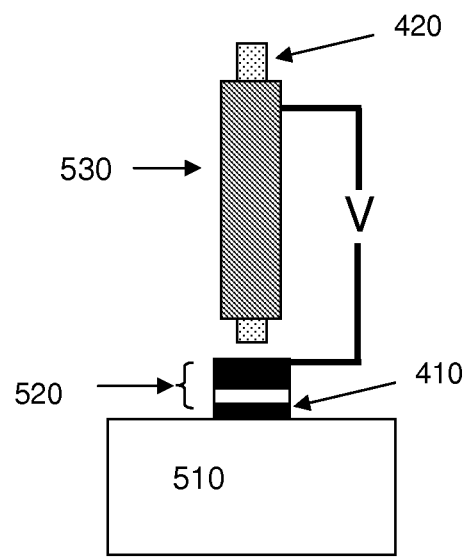
FIG. 12 illustrates schematically the anodic bonding of a PIC to an optical fiber facet.

A second method that may be used for fabricating an optical sensor probe according to the present invention comprises fabricating a photonic integrated circuit on a carrier substrate and transferring the fabricated photonic integrated circuit to the fiber facet. The circuit can be formed in the desired material system on a carrier substrate and can be patterned on e.g. a wafer-scale or chip-scale or die-scale. Then, the circuit may be transferred from the carrier substrate to the fiber facet. Attaching the photonic integrated circuit to the fiber facet can be done in several ways, such as for example by use of bonding (anodic bonding, epoxy bonding, metal bonding, glass-frit bonding, wafer direct bonding, polyimide bonding, bonding using ultra-thin BCB or polyimide layers, adhesive bonding, etc.) of a part of the carrier substrate to the fiber facet. Alignment can e.g. be done using an active alignment procedure. For example, an alignment procedure may be used wherein light is sent into the photonic integrated circuit via the fiber-to-waveguide coupler by connecting the optical fiber of the optical sensor probe to a light source. Light coupled out of the photonic integrated circuit may be received by a power detector or spectrum analyzer. By optimizing a useful parameter or property (e.g. intensity distribution) of the spectrum of the detected radiation, the fiber core can be aligned to the fiber-to-waveguide coupler during the bonding process. This alignment procedure can be used when the different layers such as bonding layers that are present between the fiber facet and the photonic integrated circuit are transparent to the wavelength range for of the source used for alignment. As an example, FIG. 12 illustrates an anodic bonding process of an optical fiber 420 and a piece of substrate 510 comprising a Silicon-on-Insulator (SOI) 520 with an integrated photonics circuit 410. Anodic bonding is a well known technique usually used to bond glass and silicon wafers, but it can be adapted to bond silicon to an optical fiber facet, since optical fibers are made out of glass. The cladding of the fiber can be coated with a conductive layer such as for example a silver epoxy 530 (leaving an un-coated section at the end of the fiber, as illustrated in FIG. 12) in order to enable an electrical connection between the fiber and the photonic integrated circuit. A piece of the SOI substrate with a thickness of for example a few micrometers and comprising the photonic integrated circuit to be bonded to the fiber facet is heated, e.g. by putting it on a hot plate. The SOI substrate may for example comprise a 220 nm thick silicon circuit layer, a 2 µm thick silicon oxide buffer layer and a 2 µm thick silicon substrate layer. The fiber facet can be actively aligned to the photonic integrated circuit and positioned so that its entire surface area is in contact with the silicon substrate layer. The piece of SOI substrate is then heated at a sufficiently high temperature, with a sufficiently high voltage between the silicon and the silver coating for a sufficient time to cause anodic bonding. In order to provide a photonic integrated circuit sufficiently small to fit onto the fiber facet, as an alternative for using small dies, etching through layers in the substrate in areas surrounding the circuit area prior to or after the bonding process may be used. Apart from anodic bonding, other bonding methods can be used for attaching the photonic integrated circuit to the fiber facet. In embodiments of the present invention a connection element may be provided in between the fiber facet and the photonic integrated circuit, as e.g. illustrated in FIG. 11. This can for example be done by providing a cavity or a cut-out in the substrate or in a layer on the substrate. Fabrication of such a connection element may involve an extra alignment step, for aligning the cavity or cut-out with respect to the photonic integrated circuit. The actual mounting of the fiber may involve using an adhesive to secure the position of the optical fiber.

Figure 13:
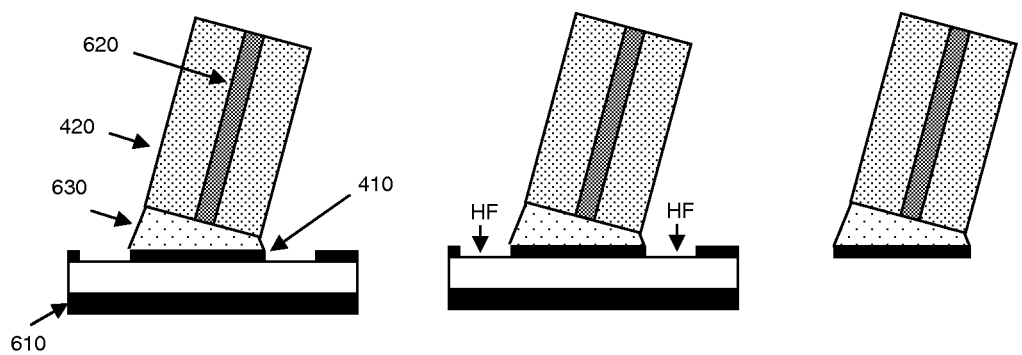
FIG. 13 illustrates the transfer of a PIC to a fiber facet after active alignment of the fiber to the circuit.

A third method that can be used for fabricating an optical sensor probe according to the present invention comprises transferring the photonic integrated circuit 410 from a carrier substrate 610, in the present example being a silicon layer on a silicon oxide layer on a silicon substrate, to the fiber facet and attaching the photonic integrated circuit to the fiber facet using an adhesive 630. The system thereby may be outlined with respect to the core region 620. An embodiment of this method is illustrated in FIG. 13. The adhesive used for attaching the photonic integrated circuit 410 to the fiber facet can for example be an UV curable material or glue, a thermally curable material or e.g. BCB. This glue may be dispensed on a surface of the circuit. The fiber is then brought in contact with or into the dispensed adhesive and is actively aligned to the circuit. The adhesive is cured (e.g. by UV illumination) such that it hardens, thereby fixing the fiber position with respect to the circuit. In order to be able to remove the fiber with the circuit adhered to the fiber facet from the carrier substrate, underetching of the layers forming the circuit may be needed. Alternatively, the substrate carrying the circuit may be treated with an anti-adhesive layer before attaching the circuit to it. This may allow removing the circuit from the carrier substrate without the need for underetching. Another method that may be used comprises providing a mold comprising cavities corresponding to an inverse or negative pattern of the structures to be formed on the photonic integrated circuit, treating it with an anti-adhesive layer, filling the cavities of the mold with the desired material for the circuit, and make use of the weak adhesion between the circuit material and the mold material to transfer the circuit to the fiber facet using an adhesive. The use of an adhesive, e.g. a polymer 630, in between the fiber facet and the photonic integrated circuit allows using an optical fiber with a straight facet (i.e. with a facet that is substantially orthogonal to the longitudinal axis of the fiber, corresponding to the light propagation direction in the fiber) while the actual mounting of the photonic integrated circuit can be done in such a way that the surface of the circuit that is bonded to the fiber forms an angle different from 90° with respect to the propagation direction in the fiber, i.e. the surface of the circuit that is bonded to the fiber is not parallel to the fiber facet. As an example, FIG. 13 illustrates the transfer of an SOI circuit to a fiber facet. The transfer process comprises providing, in between the fiber facet and the photonic integrated circuit, an intermediate polymer as an adhesive, active alignment of the fiber to the circuit and curing the intermediate polymer layer. An HF resistant curable polymer such as for example SU-8 or a similar material can be used for forming the intermediate polymer layer. The area surrounding the circuit on the SOI wafer is designed such that the underlying silicon oxide layer can be exposed to HF. After curing of the intermediate polymer layer, e.g. by use of UV illumination, the silicon oxide layer underlying the circuit is exposed to HF. As a result, underetching of the silicon layer in which the circuit is formed takes place and the underlying silicon oxide layer is removed. In a next step the fiber with the circuit attached to it can be removed from the substrate.

For some embodiments it may be advantageous to provide anti-reflective layers. The optical sensor probe can e.g. comprise an anti-reflective layer coating e.g. on the fiber facet or on a surface of the PIC.

Figure 15:
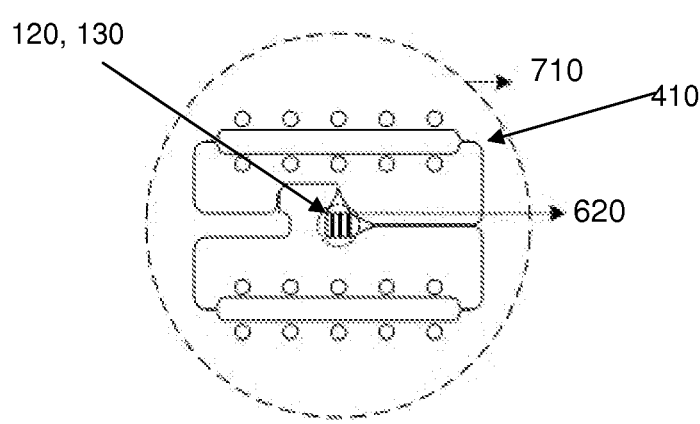
FIG. 15 illustrates an embodiment of the photonic integrated circuit that can be used in an optical sensor probe of the present invention, e.g. for bio-sensing or environmental sensing.

An optical sensor probe according to the present invention can for example be used for label-free molecular biosensing. The PIC can be an SOI based PIC with a coupling element e.g. a grating coupler and a signal processing unit e.g. comprising SOI micro-ring resonator components. Other embodiments can for example comprise surface plasmon resonators, cavity resonators, or interferometers. Biosensing based on semiconductor and other materials requires chemical modification of the surface in order to provide a suitable bio-interface. The surface modification or functionalization both provides the immobilization of the biomolecules in its most active conformation and prevents non-specific protein absorption, which can affect the sensitivity area of the biosensor. A biomolecular ligand/receptor binding on the sensor surface may change the effective refractive index of the optical waveguide modes or plasmon modes having contact with the environment. In the case of a circuit comprising micro-ring resonator sensors, the shift of the resonance wavelength can be measured for detecting a change in effective refractive index. Experimentally it has been shown that a ring of radius 4 μm is capable of detecting bulk refractive index changes of $10^{-5}$ RIU (refractive Index Units). By making use of optimized and advanced micro-ring resonators and advanced functionalization layers this sensitivity can be further enhanced. FIG. 15 schematically shows a photonic integrated circuit that may be used in an optical sensor probe of the present invention for biosensing applications. The cladding region 710 as well as the core 620 can be seen. The coupling element 120, 130, e.g. grating coupler is aligned with the core 620 of the fiber and couples light from the fiber in the waveguides of the PIC 410. These waveguides route the light through the signal processing unit on the PIC, in the example shown in FIG. 15 implemented as SOI micro-ring resonators. Changes in the environment are translated in a modification of the optical signal, e.g. the spectral transmission resonance peak is shifted when the environmental parameter to detect is present or e.g. when a biomolecular ligand/receptor binding took place. The modified optical signal is guided through the waveguides on the PIC to the same coupling element, e.g. the grating coupler, which couples the light back into the fiber. Using this optical sensor probe, remote biomolecular sensing can be done with very good sensitivity and multifunctionality, and enabling tight contact with the environment.

An optical sensor probe of the present invention can be used for e.g. biochemical, biological, environmental, chemical or electrical sensing applications by replacing the functionalization as described above with other chemical or biological or magnetic or para-magnetic materials.

Figure 14:
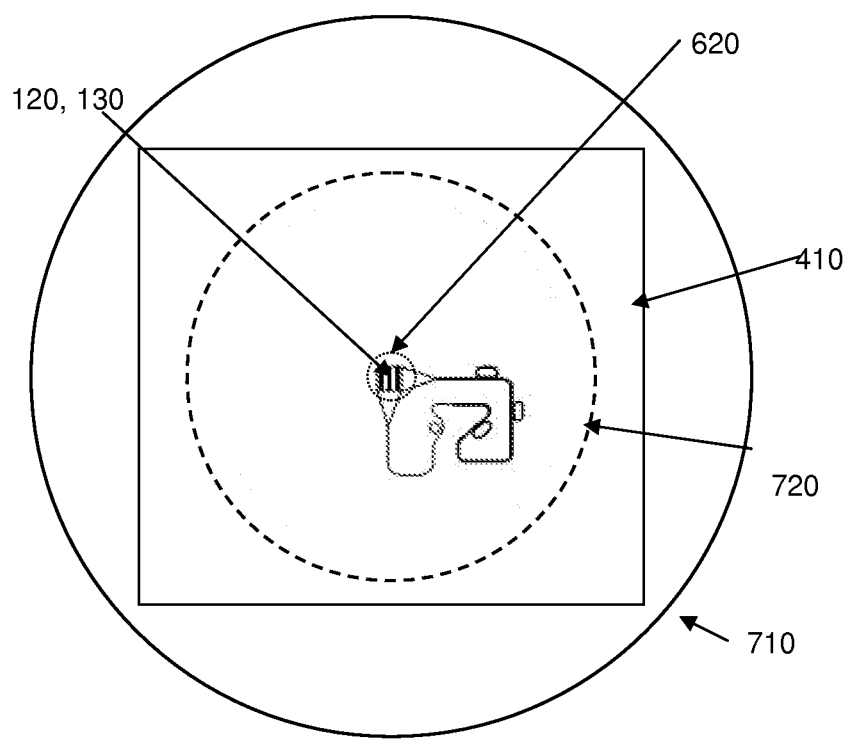
FIG. 14 illustrates an embodiment of a photonic integrated circuit that can be used in an optical sensor probe of the present invention; more in particular it shows a strain sensor mounted on an intermediate optical element that is physically attached to a fiber facet.

A second example of an optical sensor probe is a pressure sensor. In this application, the PIC comprises a strain sensor. The PIC may be an SOI based PIC with a coupling element e.g. a grating coupler and a signal processing unit comprising strain sensing elements such e.g. SOI micro-ring resonator components. Other components can be used such as for example surface plasmon resonators, cavity resonators, interferometers. The strain gage may consist of a thin polyimide foil with an integrated optical circuit. The optical response to strain of the microresonators is a wavelength shift of the resonance wavelength. The optical circuit may comprise several of these resonators to measure strain in different directions. The strain sensor can be read out using the single-mode optical fiber of the optical sensor probe according to this invention. A preferred embodiment makes use of an intermediate optical element or a cavity etched in the fiber facet on which the PIC is e.g. mounted as a membrane. As an example of such a preferred embodiment, FIG. 14 illustrates a strain sensor mounted on an intermediate optical element that is physically attached to the fiber facet. The coupling element 120, 130, e.g. grating coupler is aligned with the core 620 of the fiber and couples light from the fiber in the waveguides of the PIC 410. These waveguides route the light through the signal processing unit on the PIC 410, implemented as e.g. SOI micro-ring resonators, e.g. having different resonance wavelengths. The cladding region 710 and mount edge 720 are also shown. The optical response to strain is a wavelength shift of the resonance wavelength of the micro-ring resonators. A micro-resonator for sensing variations in temperature can be added. The modified optical signal is guided through the waveguides on the PIC 410 to the same coupling element 120, 130, e.g. the grating coupler, which couples the light back into the fiber. Because the different micro-resonators in the photonic integrated circuit may have different resonance wavelengths, they can be read out using the same fiber. Using this optical sensor probe, remote pressure sensing can be done with very good sensitivity and multifunctionality.

An optical sensor probe of the present invention comprises an optical fiber with an integrated photonic circuit physically attached to a facet of the fiber. Similar devices, i.e. devices comprising a fiber with a PIC attached to a fiber facet, may be used for other applications than sensor applications, such as for example optical signal processing applications and telecommunication applications. In prior art devices, coupling of light between an optical fiber and a photonic integrated circuit is for example done in-plane by V or U grooves. However this is a very space consuming method. Another prior art coupling method is based on vertical coupling with e.g. angled fibers. Packaging of these devices can be challenging and expensive. Transferring a photonic integrated chip onto the fiber facet, as described in the present invention, may be a space saving and robust packaging solution. Moreover for single fiber-in fiber-out chips no packaging may be needed at all. One embodiment may comprise a PIC physically attached to the facet of an optical fiber, with a retro-reflective signal processing unit being integrated in the PIC.

In a fourth application of a non-specular retro-reflective PIC of the present invention, the PIC can be used as a dispersed sensor. More particularly, a plurality of PICs enabling non-specular reflection for one angle of incidence (and its angular surroundings) can be embedded in a medium with a random orientation, wherein the number of PICs is sufficiently high to provide a statistically significant probability of covering a large range of angles of incidence. This embedding can be static, in which the PICs are in fixed positions at fixed angles. This embedding can be dynamic, wherein the position and angles of the devices are not fixed. In the latter case, the statistical coverage of the angles of incidence is also influenced by the time of observation. A dispersed sensor for characterization of fluid analytes can enhance the response time that may be limited by the diffusion length of the specimens to the sensor. By use of e.g. magnetic fields, the separate PICs can be held apart preventing coagulation of the sensors. By use of e.g. static magnetic fields or electric fields, the separate PICs can be preferentially oriented. By use of e.g. alternating magnetic fields or electric fields the separate PICs can be used to stir.

It should be understood that the illustrated embodiments are examples only and should not be taken as limiting the scope of the present invention. The claims should not be read as limited to the described order or elements unless stated to that effect.

The invention claimed is:

1. A photonic integrated circuit comprising at least one signal processing circuit, the at least one signal processing circuit comprising at least one input coupling element for coupling incident light from a predetermined incoupling direction into the photonic integrated circuit, and at least one output coupling element for coupling light out of the photonic integrated circuit into an outcoupling direction, the photonic integrated circuit being configured such that light coupled into the photonic integrated circuit through the input coupling element is propagated through and processed in the signal processing circuit and coupled out of the output coupling element,
   wherein the relation between the incoupling direction and the outcoupling direction is different from a relation for reflection at a surface according to the law of reflection, the incoupling direction and the outcoupling direction being substantially opposite so that retro-reflective operation is obtained and the light is sent back into the direction it originated from.

2. The photonic integrated circuit according to claim 1, wherein the at least one input coupling element is the same element as the at least one output coupling element.

3. The photonic integrated circuit according to claim 1, wherein the at least one signal processing circuit comprises a plurality of input coupling elements, each of the input coupling elements being optimized to cover a specific range of angles of incidence, such that the response or the properties of the light coupled out of the photonic integrated circuit are insensitive to the direction of light incidence on the photonic integrated circuit.

4. The photonic integrated circuit according to claim 1, the photonic integrated circuit being part of a sensing element and integrated on a facet of at least one optical fiber.

5. An optical sensor probe, the optical sensor probe comprising a photonic integrated circuit, comprising at least one signal processing circuit, the at least one signal processing circuit comprising at least one input coupling element for coupling incident light from an incoupling direction into the photonic integrated circuit, and at least one output coupling element for coupling light out of the photonic integrated circuit into an outcoupling direction, the photonic integrated circuit being adapted such that light coupled into the photonic integrated circuit through the input coupling element is propagated through the signal processing circuit and coupled out of the output coupling element, the signal processing circuit further comprising at least one optical component adapted for generating an optical response to an external parameter,
   wherein the relation between the incoupling direction and the outcoupling direction is different from a relation for reflection at a surface according to the law of reflection, the incoupling direction and the outcoupling direction being substantially opposite so that retro-reflective operation is obtained and the light is sent back into the direction it originated from.

6. The optical sensor probe according to claim 5, wherein the at least one input coupling element is the same element as the at least one output coupling element.

7. The optical sensor probe according to claim 5, wherein the optical sensor probe further comprises at least one optical fiber having a first facet and comprising a sensing element physically attached to the first facet, wherein the sensing element comprises said photonic integrated circuit, wherein the optical fiber is optically coupled to the photonic integrated circuit through the at least one input coupling element and the at least one output coupling element.

8. The optical sensor probe according to claim 7, wherein the photonic integrated circuit comprises an optical coupling element for coupling light between the at least one optical fiber and the photonic integrated circuit and wherein the photonic integrated circuit comprises one or more light guiding structures adapted to guiding light as an optical mode.

9. The optical sensor probe according to claim 5, wherein the at least one optical component is a resonator, a micro-ring resonator, a plasmon resonator, a cavity, an interferometer, a coupler, a splitter, a waveguide, a one-dimensional grating separate from the input coupling element and the output coupling element, a two-dimensional grating separate from the input coupling element and the output coupling element, a multiplexer, a demultiplexer or a combination thereof.

10. The optical sensor probe according to claim 5, where the optical response is a change in resonance frequency, intensity, phase, polarization or spectrum of a beam.

11. The optical sensor probe according to claim 5, wherein the external parameter is a temperature, strain, stress, pressure, torque, vibration, an acoustic wave, a magnetic field, an electric field, a biological substance, a chemical, a biochemical reaction, a drug, a protein or a combination thereof.

12. The optical sensor probe according to claim 5, wherein a surface of the photonic integrated circuit is at least partially functionalized by providing a parameter sensitive overlay.

13. The optical sensor probe according to claim 8, wherein the optical coupling element comprises at least one grating coupler.

14. The optical sensor probe according to claim 8, wherein the optical mode is a waveguide mode, a surface plasmon mode or a combination thereof.

15. The optical sensor probe according to claim 7, wherein the first facet forms an angle different from 90° with respect to a light propagation direction in the at least one optical fiber.

16. The optical sensor probe according to claim 5, wherein the photonic integrated circuit is a processed silica die, a processed silicon die, a processed silica-on-silicon die, a processed silicon-on-insulator die, a processed $Al_xGa_{1-x}As$ die, a processed $In_xGa_{1-x}As_yP_{1-y}$ die, a processed metal layer or a combination thereof.

17. The optical sensor probe according to claim 5, wherein the processed die has a thickness in the range between 10 nm and 10 μm.

18. The optical sensor probe according to claim 7, wherein the sensing element comprises a connection element or intermediate optical element physically attached to the first fiber facet and wherein the photonic integrated circuit is physically attached to the connection element or intermediate optical element.

19. The optical sensor probe according to claim 18, wherein the photonic integrated circuit is mounted as a membrane on the connection element or intermediate optical element.

20. A method of manufacturing an optical sensor probe, the method comprising:
   providing an optical fiber having a facet;
   providing a sensing element comprising a photonic integrated circuit according to claim 1,
   aligning the input coupling element and the output coupling element of the signal processing circuit of the photonic integrated circuit with a core of the optical fiber; and
   physically attaching the sensing element to the facet.

21. A method of manufacturing according to claim 20 wherein aligning the input coupling element and the output coupling element of the signal processing circuit of the photonic integrated circuit with the core of the optical fiber comprises an active alignment step.

22. An optical measurement system comprising an optical sensor probe according to claim 5.

23. A photonic integrated circuit comprising at least one signal processing circuit, the at least one signal processing circuit comprising at least one input coupling element for coupling incident light from a predetermined incoupling direction into the photonic integrated circuit, and at least one output coupling element for coupling light out of the photonic integrated circuit into an outcoupling direction,
   wherein the relation between the incoupling direction and the outcoupling direction is different from a relation for reflection at a surface according to the law of reflection, the incoupling direction and the outcoupling direction being substantially opposite so that retro-reflective operation is obtained and the light is sent back into the direction it originated from, and
   wherein the at least one signal processing circuit comprises a plurality of input coupling elements, each of the input coupling elements being optimized to cover a specific range of angles of incidence, such that the response or the properties of the light coupled out of the photonic integrated circuit are insensitive to the direction of light incidence on the photonic integrated circuit.

\* \* \* \* \*